Figure 1:
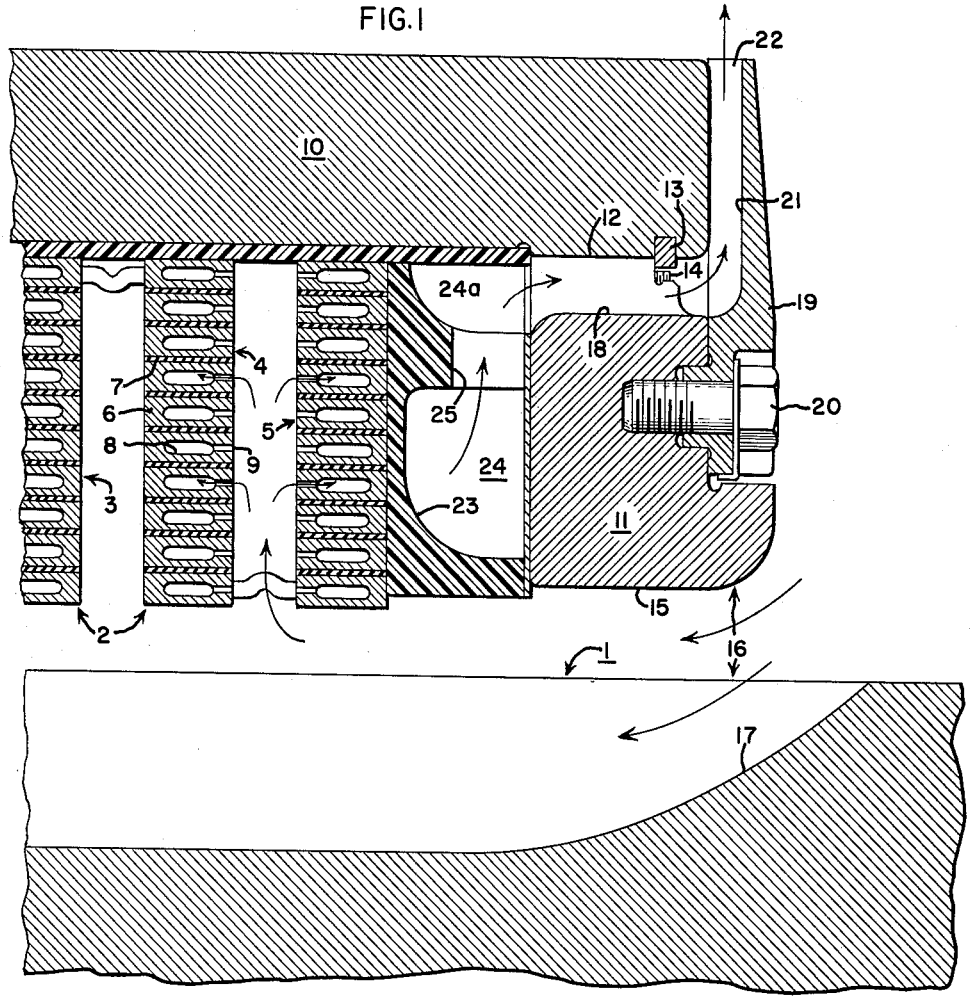

Dec. 21, 1965 H. W. KUDLACIK 3,225,231
GAS-COOLED END WINDING FOR DYNAMOELECTRIC MACHINE ROTOR
Filed Sept. 19, 1963 4 Sheets-Sheet 1

INVENTOR:
HENRY W. KUDLACIK,
BY W. C. Crutcher
HIS ATTORNEY.

Dec. 21, 1965  H. W. KUDLACIK  3,225,231
GAS-COOLED END WINDING FOR DYNAMOELECTRIC MACHINE ROTOR
Filed Sept. 19, 1963  4 Sheets-Sheet 3

INVENTOR:
HENRY W. KUDLACIK,
BY *W. C. Crutcher*
HIS ATTORNEY.

Dec. 21, 1965 H. W. KUDLACIK 3,225,231
GAS-COOLED END WINDING FOR DYNAMOELECTRIC MACHINE ROTOR
Filed Sept. 19, 1963 4 Sheets-Sheet 4

INVENTOR:
HENRY W. KUDLACIK,
BY W. C. Crutcher
HIS ATTORNEY.

United States Patent Office 3,225,231
Patented Dec. 21, 1965

3,225,231
GAS-COOLED END WINDING FOR DYNAMO-
ELECTRIC MACHINE ROTOR
Henry W. Kudlacik, Scotia, N.Y., assignor to General
Electric Company, a corporation of New York
Filed Sept. 19, 1963, Ser. No. 309,985
12 Claims. (Cl. 310—64)

ABSTRACT: GAS-COOLED DYNAMOELECTRIC MACHINE ROTOR HAS CIRCUMFERENTIALLY EXTENDING DUCT 23 BETWEEN OUTERMOST COIL 5 AND CENTERING RING 11. SPENT COOLING GAS ENTERING DUCT FROM SMALL CIRCUMFERENTIAL ZONE(S) IS DISCHARGED OVER LARGE CIRCUMFERENTIAL ZONE NEAR ROTOR PERIPHERY THROUGH MULTIPLE OUTLETS 22.

This invention relates to an improved arrangement for cooling the end turns of a dynamoelectric machine rotor, such as the rotor of a hydrogen-cooled generator. More particularly, it relates to an improved structure for discharging gas from the end of a dynamoelectric machine rotor after it has cooled the windings.

The problem of obtaining sufficient cooling gas flow to properly cool the windings of a dynamoelectric machine rotor so they will not become overheated is well known. The problem is particularly acute in high-speed rotors of substantial length, since the outer diameters are limited by stress considerations, while the diameter of the supporting spindle portion must be large enough to provide proper rotor stiffness. This imposes stringent limitations on the designer, who is trying to pass sufficient cooling gas into the end of the rotor to adequately cool the windings, both along the slots and around the end turn portions of the windings. If it is also desired to discharge gas from the end of the rotor after it has cooled the end turns, it will be found that the area required to remove gas will reduce the area available for incoming gas. Generally speaking, gas cannot be discharged through the "retaining ring" holding the windings in place, because this member is under very high stress; slots and holes therein are to be avoided.

It has been suggested that additional discharge areas might be obtained by passing gas axially through the end winding stack and through aligned holes in the radial "centering ring" at the end of the rotor, by means of a fan-like vent attached to the centering ring.

While the foregoing arrangement is useful for discharging gas at a specified location, such as the pole centers, the necessity for large axial holes through the centering ring at this particular location to accommodate the size of the gas passage feeding it may weaken the centering ring. Also, the gas is only discharged at certain locations on the rotor, restricting the amount of gas which can be removed.

Accordingly, one object of the present invention is to provide an improved arrangement for effecting discharges of gas from the end of a gas-cooled dynamoelectric machine rotor.

Another object of the invention is to provide a gas cooling arrangement for a dynamoelectric machine rotor which gives improved distribution of gas flow and increased centrifugal pumping action of gas passing through the centering ring to the outside of the rotor.

Still another object of the invention is to provide an improved cooling gas discharge arrangement which increases the gas discharge flow area without increasing the rotor diameter or substantially reducing the gas inlet flow area.

Figure 2:
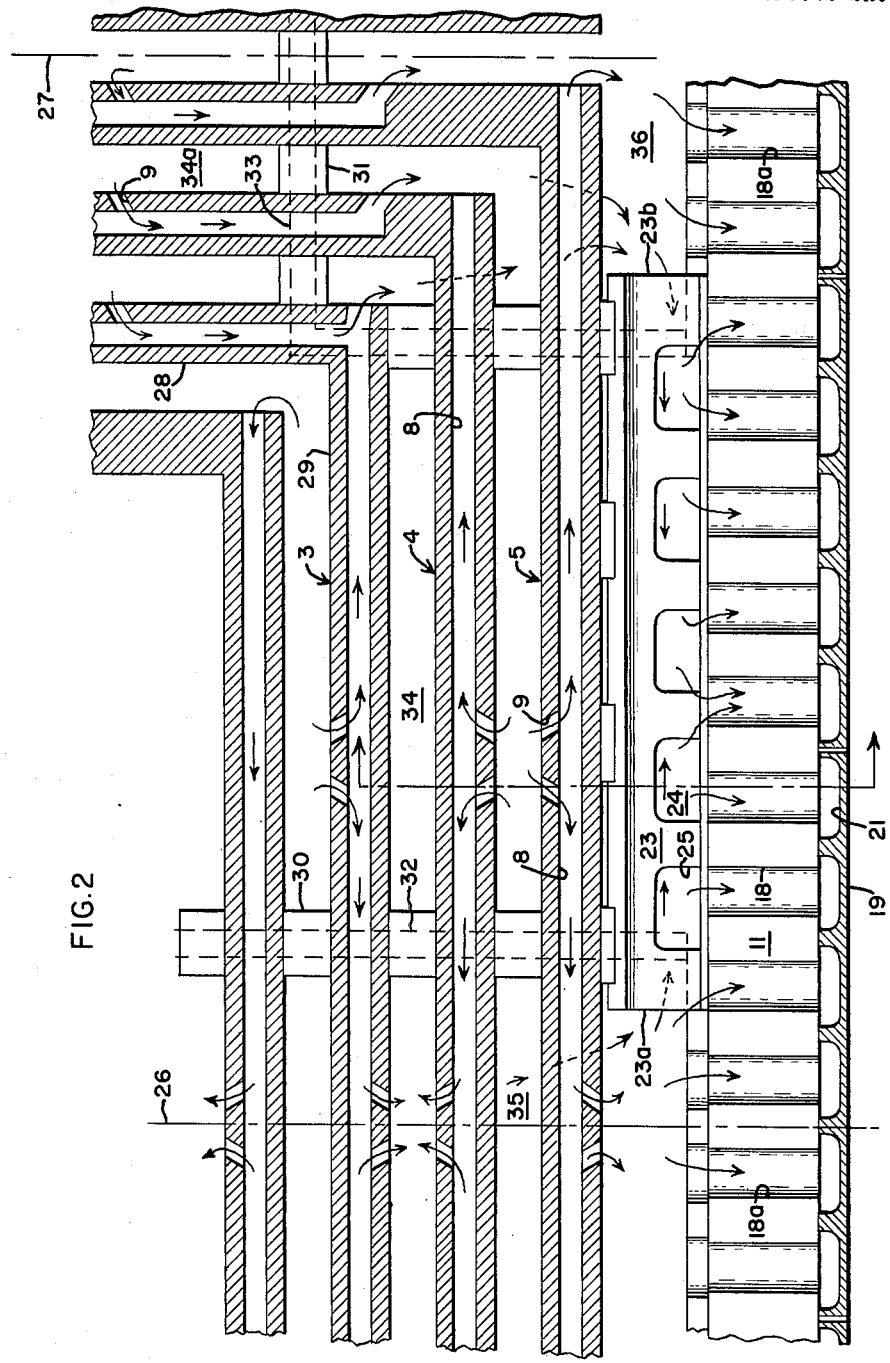
Figure 3:
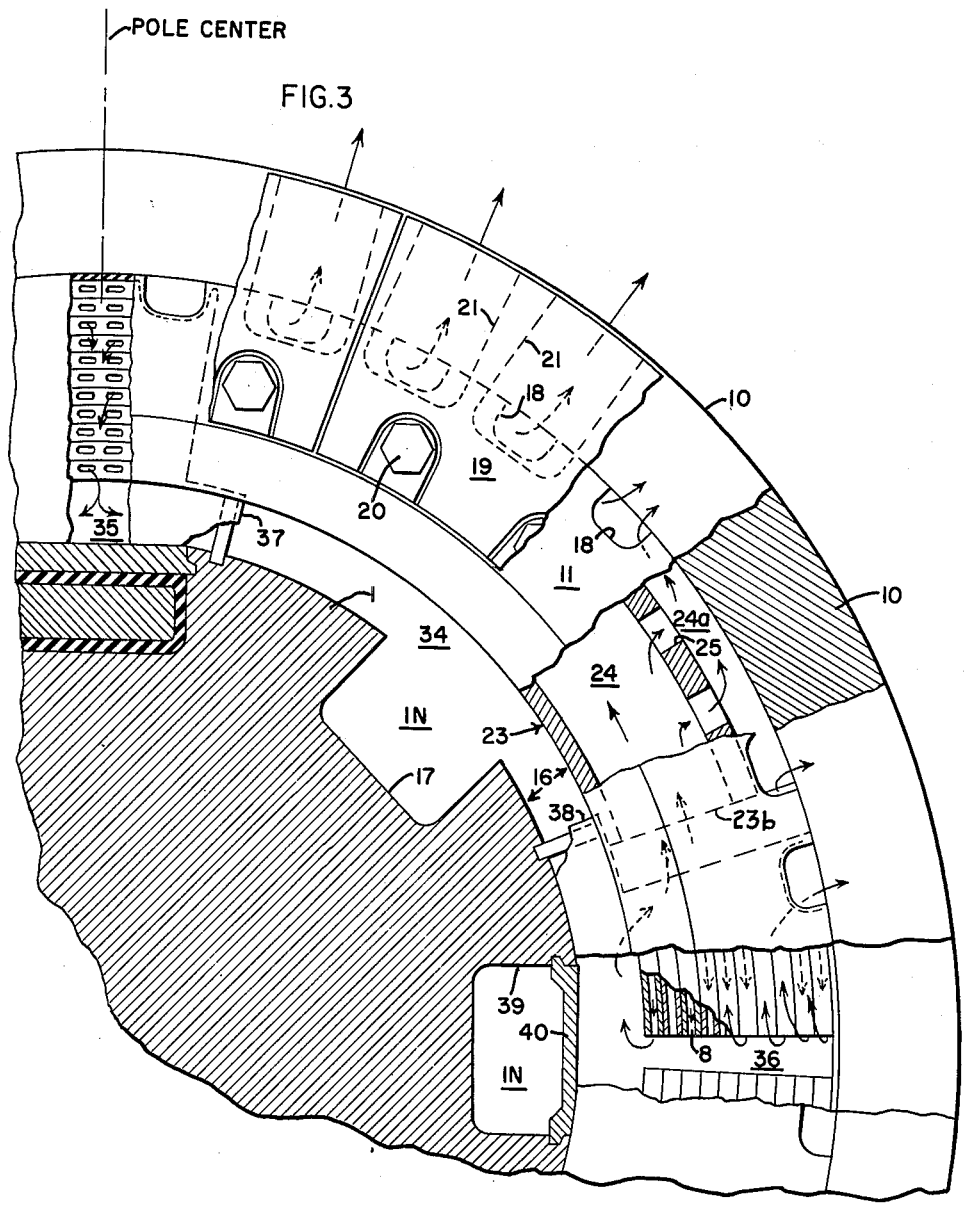
Figure 4:
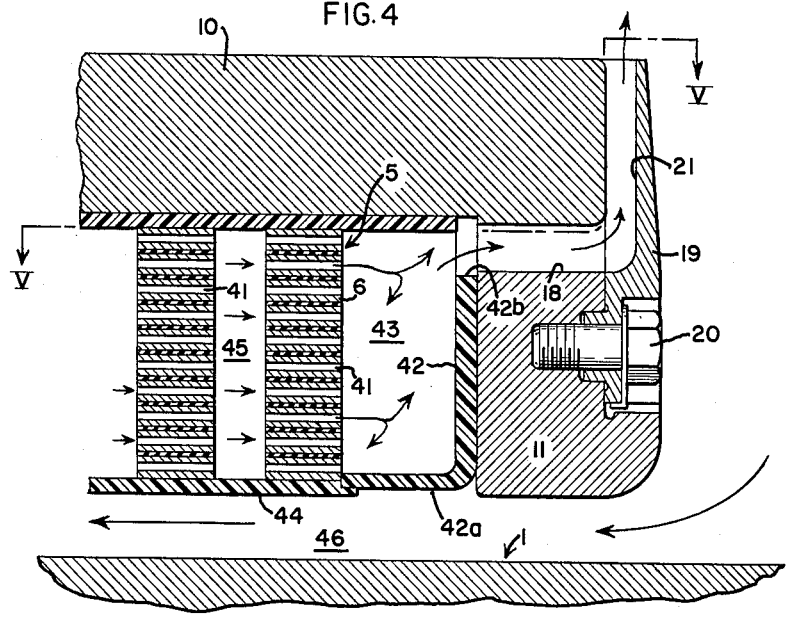
Figure 5:
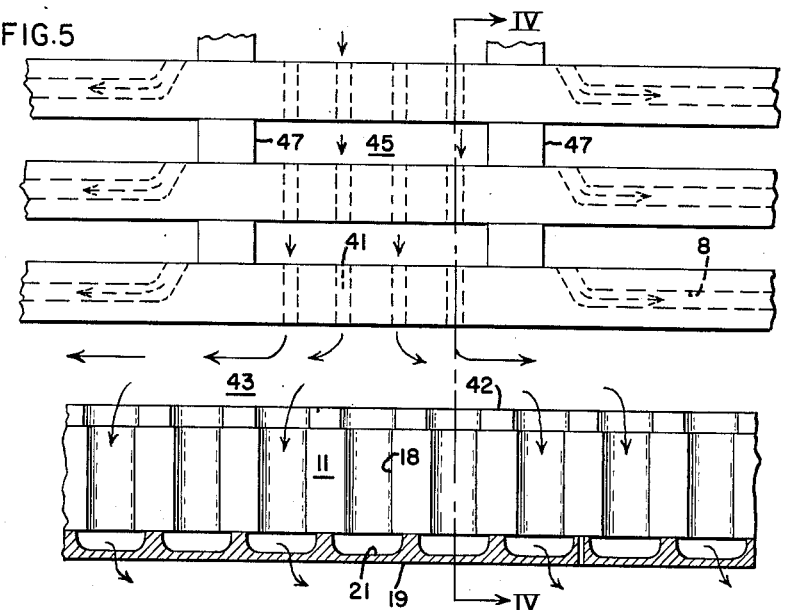

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings, in which:

FIG. 1 is an elevation view, in cross section, showing a portion of the rotor end winding with associated rotor members, FIG. 2 is a developed plan view of the outermost turns of a dynamoelectric machine winding, looking radially inward, with the retaining ring removed, FIG. 3 is an end view of the rotor, in cross section, broken away to show the construction of various elements, FIG. 4 is a simplified elevation view, similar to FIG. 1, illustrating a modification of the invention, and FIG. 5 is a developed plan view, similar to FIG. 2, of the modified form of the invention.

Briefly stated, the invention is practiced by extending the length of the rotor end turn region so as to provide a peripheral gas distribution chamber in the space between the last stack of conductors and the centering ring. The peripheral distribution chamber distributes gas circumferentially from specific gas inlet thereinto, so that gas can flow through a large number of axial passages at the outer diameter of the centering ring and through radial fans which discharge the gas around the rotor periphery.

Referring now to FIG. 1 of the drawing, the rotor spindle 1 supports a larger body portion of the rotor (not shown) having slots in which are disposed a distributed winding comprised to circumscribed coils. The winding has an end turn portion extending beyond the body portion around spindle 1, a portion of which is seen at 2. The outermost coils of end windings 2 comprise coils 3, 4, 5 of radially stacked conductors 6 separated from one another by "turn" insulation 7. Conductors 6 preferably have longitudinally extending internal gas cooling passages 8 which, at specified locations, have ports 9 cut through the walls of the conductors.

The end winding conductor coils are held in place against centrifugal force through the use of a retaining ring 10. One end of the retaining ring is affixed to the body portion of the rotor by means of a suitable connection (see, for example, U.S. Patent 2,960,360 issued to H. D. Taylor on Nov. 15, 1960 and assigned to the present assignee). The other end of retaining ring 10 overhangs spindle 1 and is securely attached to a radially extending disk hereinafter designated a centering ring 11. Centering ring 11 may be affixed by means of a shrink fit at surface 12 and a locking key 13 held in place by screw 14. The inner surface 15 of centering ring 11 is radially spaced from spindle 1 to provide a gas inlet passage 16; additional gas inlet area may be provided at suitable circumferentially-spaced locations around spindle 1 by means of slots such as the one shown at 17 cut in the spindle. A fan (not shown) attached to turn with the rotor forces cooling gas to flow inward at passages 16, 17.

The outer diameter of centering ring 11 contains a number of circumferentially spaced cutouts 18 disposed about the periphery, furnishing axially extending passages through the centering ring. Attached to the outside end of centering ring 11 are a group of fan-shaped segments 19 held in place by bolts 20. Each of the arcuate members 19 has a group of circumferentially spaced pockets 21, whose inlets are aligned with the cutouts 18. The pockets 21 are shaped to provide outlets 22 near the outer periphery of retaining ring 10.

In accordance with the invention, the axial spacing between coil 5 (the outermost coil of conductors) and centering ring 11 is enlarged. In this enlarged space is disposed a member 23, preferably of insulating material, which defines an arcuate circumferentially extending distribution chamber 24. Chamber 24 is connected with an additional supplementary distribution chamber 24a by means of circumferentially spaced, radially directed holes 25 through member 23.

Referring now to FIG. 2 of the drawing, the developed plan view shows the arrangement of the outermost coils of the winding over one quadrant of the rotor, i.e., from the pole axis 26 to the quadrature axis 27. Although various cooling flow patterns may be employed with the use of the invention, the one illustrated in FIG. 2 is exemplary. It will be observed that each of the coils is comprised of separate conductors having axially extending portions 28 and circumferentially extending portions 29. The coils are axially and circumferentially separated from one another by means of radial spacer blocks, such as the ones illustrated at 30, 31 respectively. In addition, blocking members beneath the stacks, extending axially and circumferentially such as the ones illustrated at 32, 33 respectively, are used to divide the space between the rotor spindle and the underside of the coils into inlet and discharge zones. In the flow pattern illustrated in FIG. 2, the interconnected gas inlet zones 34, 34a are supplied by gas flowing beneath the centering ring and through slots in the spindle (see FIG. 1). It will be observed that gas can then flow radially outward between the coils 3, 4, 5 and into the longitudinally extending passages 8 by means of the ports 9 cut through the walls of the individual conductors. From there, the gas can flow through the internal passages 8 to suitable discharge zones between and below the coils. There are two discharge zones here designated as zones 35, 36. Zone 35 is located near the pole axis 26 and zone 36 is located near the outermost coil corners at the quadrature axis 27. Inlet zones 34, 34a are separated from outlet zones 35, 36 by means of the spacer blocks 30, 31 and blocking members 32, 33 as mentioned previously.

In accordance with the invention, the discharge area from outlet zones 35, 36 is greatly increased by means of the special discharge arrangement, including the arcuate duct-defining member 23 between the outermost coil stack 5 and the centering ring 11. Cooling gas after being discharged from the longitudinal ducts 8 into chambers 35, 36 can flow from there into the peripheral distribution chamber 24 at either end of member 23 through the end openings designated 23a, 23b. The large axial spacing between coil 5 and centering ring 11 allows a substantial quantity of gas to flow circumferentially and then radially through holes 25. From there, it is distributed to the cutout passages 18 on the periphery of the centering ring, and thence to the discharge pockets 21, and is pumped to the periphery of the rotor.

Of course, gas can also leave directly through the centering ring from discharge zones 35, 36 by flowing through cutouts 18a which are disposed near the pole axis and quadrature axis. However, by the use of the special member 23 extending over the portion of the rotor occupied by inlet zone 34, additional gas discharge area can be obtained by merely lengthening the rotor slightly. In this manner, gas discharge can take place about the entire periphery.

Referring to FIG. 3 of the drawing, additional details of the arrangement may be seen. The segments 19 are seen to consist of fan-like members having several of the radial discharge pockets 21 circumferentially spaced and aligned with the cutouts 18 in the centering ring 11. It will be observed that gas leaving the internal conductor passages 8 and entering discharge zones 35, 36 then flows to enter the ends 23a, 23b (see FIG. 2) of member 23, so as to flow circumferentially and to be distributed to the cutout passages 18 around the entire circumference of the rotor. Additional details specific to the embodiment shown include the members 37, 38 blocking off a portion of the radial spacing 16 to prevent gas in the discharge zones 35, 36 respectively from escaping beneath the centering ring. It may also be noted that a slot 39, similar to slot 17, is employed for additional gas inlet area. Slot 39 is provided with a cover 40 extending toward the rotor body as far as the circumferentially extending blocking 33 (see FIG. 2) so as to supply gas to the space 34a.

FIGS. 4 and 5 illustrate a modification of the invention, in which the peripheral flow distribution chamber is constructed in a slightly different manner and, in addition to being supplied ae the ends thereof, it has an additional inlet between its ends. In FIG. 4, the retaining ring 10, centering ring 11, and fan member 19 are constructed much the same as previously. However, in addition to the longitudinal ducts in the conductors, the flow paths are further subdivided by providing axial ducts 41 extending through the entire width of conductors 6 at specified locations. The arcuate distribution duct here is formed slightly differently by employing an L-shaped insulating piece 42 having a portion 42a blocking off a large arcuate duct 43 between the outermost coil and centering ring 11. Member 42 is provided with suitable cutouts 42b which are aligned with cutouts 18. An additional baffle 44 extends below the end turn stacks to isolate a discharge zone 45 from an inlet zone 46 beneath the end turns.

Referring to FIG. 5 of the drawing, a portion of the plan view of the outermost coils with the retaining ring removed may be seen. Suitable spacer blocks 47 isolate the inlet zone 45, so that the gas flows axially across and through the end turn portion by means of the transverse passages 41 extending through the conductors. Thus, the gas enters the distribution duct 43 at some intermediate portion along the member 42, and flows circumferentially, entering the cutout portions 18 and discharging from fan pockets 21, as before. The modification of FIGS. 4 and 5 may provide additional entry area into the peripheral distribution chamber, as well as allowing subdividing the longitudinal internal flow passages 8 in some cases. Shortening the flow paths of the passages 8 lowers the pressure drop of the cooling gas in passing through the conductors and enables more effective cooling.

The operation of the invention should be apparent from the following explanation. In FIGS. 1-3, it will be apparent that the cooling gas, after passing longitudinally through the conductors, discharges at zones near the pole axis and quadrature axis and flows into the ends of the distribution duct, i.e., at either end of member 23. From here, it flows in both directions toward the center of the duct, distributing itself along the way to the various cutout passages 18 around the centering ring. In this manner, discharge of the cooling gas can be accomplished about the entire periphery of the rotor.

It should be recalled that, from the nature of the conventional arrangement of rotor end windings, gas can only be discharged at certain circumferentially spaced locations along the circumferentially extending portion of the end turns (unless it is to flow downward between stacks and out under the centering ring, in which case the amount of area available for inlet gas is decreased). By extending the length of the end turn portion of the rotor, i.e, increasing the spacing between the last or outermost coil and centering ring, and by employing the circumferentially-extending distribution chamber of the invention, discharge through the centering ring is no longer limited to these certain locations on the periphery. It follows in addition that, since gas is available for discharge around the entire periphery, the passages through the centering ring can be smaller and evenly distributed about its periphery, rather than requiring large openings at specified locations.

These small passages through the centering ring are at the outer diameter where the centering ring tangential stresses may be lower and where they can contribute best to creating a pumping head to aid in the discharge of gas. Likewise, the segments 19 providing a fan pocket for each passage through the centering ring and carrying the gas to the outer diameter of the retaining ring for discharge, make the arrangement still more effective in pumping gas from the end turn space.

In the modifications of FIGS. 4 and 5, the peripheral discharge duct of the invention is fed at an intermediate location, as well as (or in lieu of) being fed from the ends of the discharge duct. Therefore, in cases where it is also desired to limit the length of internal passage in the conductor (with its commensurate high pressure drop), the circumferentially extending portion of the end turns can be subdivided by means of the cross-flow passages indicated at 41 and additional flow can thus be obtained.

Thus it can be seen that, by lengthening this portion of the rotor slightly, an improved flow pattern can be obtained, enabling the passage of larger amounts of cooling gas without increasing the diameter of the rotor or without impairing the rigidity of the spindle portion of the rotor.

While there has been shown what is considered to be the preferred embodiment of the invention, other modifications will occur to those skilled in the art, and it is intended to cover in the appended claims all such modifications as fall within the true spirit and scope of the invention.

What I claim as new and desire to secure by Letters Patent of the United States is:

1. In a gas-cooled dynamoelectric machine rotor having a winding with circumscribed coils and end turns extending beyond the rotor body, the combination of:
    a retaining ring holding the coils in place,
    a centering ring blocking off an annular chamber beneath the retaining ring,
    means supplying a flow of gas cooling the conductors, said gas being discharged at a first blocked-off zone in said chamber, and
    means defining a circumferentially extending duct having an inlet communicating with said first zone and having a plurality of outlets disposed on the outside of the centering ring and spread over a substantially greater portion of the rotor circumference than is covered by said first zone.

2. In a gas-cooled dynamoelectric machine rotor having a winding with circumscribed coils and end turns extending beyond the rotor body, the combination of:
    a plurality of circumferentially extending conductors disposed in the outermost coil of said end turns,
    a retaining ring disposed radially outward of said conductors, holding them in place,
    a centering ring axially spaced from said conductors defining a plurality of circumferentially spaced passages therethrough beneath the retaining ring,
    means supplying a flow of gas for cooling said conductors, said gas being discharged at a first zone on the rotor beneath the retaining ring, and
    means defining a circumferentially extending duct between said conductors in the outermost coil and the centering ring, said duct having an inlet communicating with said first zone and conducting gas circumferentially to a group of said centering ring outlet passages which are circumferentially spaced from said first zone.

3. The combination according to claim 2, wherein said group of centering ring passages extends over a substantially greater arcuate portion of the rotor than does said first zone, whereby the size of said pasages may be reduced below that which would be required if the passages extended only over the first zone.

4. The combination according to claim 2, wherein a said first zone is located at each rotor pole and at each quadrature axis, and wherein said centering ring passages are disposed about the entire rotor periphery.

5. The combination according to claim 2, wherein a said first zone is located at each rotor pole and wherein said centering ring passages are disposed about the entire rotor periphery.

6. The combination according to claim 2, wherein said duct-defining means comprises an insulating arcuate member disposed between the outermost coil on the centering ring and open at either end to allow gas to flow from either end toward the center thereof.

7. The combination according to claim 2, wherein said conductors define transverse holes over a first section supplying a first portion of said cooling gas flow to an intermediate part of said duct, and wherein said conductors also define longitudinal internal cooling passages over a second section supplying another portion of the cooling gas to the end of said duct.

8. In a gas-cooled dynamoelectric machine rotor having a winding with circumscribed coils and end turns extending beyond the rotor body, the combination of:
    a plurality of circumferentially extending conductors disposed in the outermost coil of said end turns, said conductors defining internal circumferentially extending cooling passages with inlet ports and outlet ports for the internal passages,
    a retaining ring disposed radially outward of said conductors holding them in place,
    a centering ring radially inward of said retaining ring and axially spaced from said conductors, said centering ring defining a plurality of circumferentially spaced passages therethrough forming gas outlets beneath the retaining ring,
    means supplying a flow of cooling gas to a first group of said conductor inlet ports disposed in a first zone extending over a portion of the rotor circumference, and discharging gas from a group of said conductor outlet ports disposed in a second zone extending over a different portion of the rotor circumference, and
    means defining a circumferentially extending duct between said conductors in the outermost coil and the centering ring, said duct having an inlet communicating with said second zone and conducting gas circumferentially to a group of said centering ring passages extending over at least the same portion of the rotor circumference as the first zone.

9. The combination according to claim 8, wherein said centering ring gas outlet passages extend over at least the same portions of the rotor circumference as do the first and second zones.

10. The combination according to claim 8, wherein a said first zone is disposed at each pole and quadrature axis of the rotor, wherein said duct-defining means extends over each arc of the rotor periphery between said axes, and wherein said centering ring passages are circumferentially spaced about the entire rotor periphery.

11. The combination according to claim 8, wherein a said first zone is disposed at each pole of the rotor, wherein said duct-defining means extends over the portion of the rotor periphery between poles, and wherein said centering ring passages are circumferentally spaced about the entire rotor periphery.

12. In a gas-cooled dynamoelectric machine rotor with a spindle portion and having a winding with circumscribed coils and end turns extending beyond the rotor body, the combination of:
    a plurality of circumferentially extending conductors disposed in the outermost coil of said end turns, said conductors defining longitudinally extending internal cooling passages with inlet ports,
    a retaining ring disposed radially outward of said conductors holding them in place,
    a centering ring inside the retaining ring axially spaced from said conductors and radially spaced from said spindle portion to define gas supply passages to the inlet ports of said end turns, said centering ring also defining a plurality of circumferentially spaced passages therethrough near its periphery forming gas outlets,
    means providing a plurality of radially directed fan discharge passages having inlets communicating with the centering ring passages, and outlets near the retaining ring periphery for pumping spent cooling gas from the rotor end turns, means defining a circumferentially extending duct in the axial space between said conductors in the outermost coil and the centering ring, said duct having an inlet communicating with a first discharge zone fed by gas from the conductor internal passages and conducting gas circumferentially to a group of centering ring passages circumferentially displaced from said first discharge zone, whereby gas may be discharge through said radial fan discharge passages over a substantially greater portion of the rotor periphery than is encompassed by said first discharge zone.

References Cited by the Examiner
UNITED STATES PATENTS

| | | | |
|---|---|---|---|
| 2,653,255 | 9/1953 | Baudry et al. | 310—64 |
| 2,786,951 | 3/1957 | Morgan | 310—61 |
| 2,833,944 | 5/1958 | Willyoung | 310—61 |
| 3,005,119 | 10/1961 | Schmidt | 310—64 |

ORIS L. RADER, *Primary Examiner.*